(12) United States Patent
Hassemer et al.

(10) Patent No.: US 8,248,764 B2
(45) Date of Patent: Aug. 21, 2012

(54) HINGE MECHANISM IN ELECTRONIC HANDSET

(75) Inventors: Brian J. Hassemer, Gurnee, IL (US); Roger W. Harmon, Crystal Lake, IL (US); Michiel S. Knoppert, Chicago, IL (US)

(73) Assignee: Motorola Mobility LLC, Libertyville, IL (US)

( * ) Notice: Subject to any disclaimer, the term of this patent is extended or adjusted under 35 U.S.C. 154(b) by 245 days.

(21) Appl. No.: 12/711,411

(22) Filed: Feb. 24, 2010

(65) Prior Publication Data

US 2011/0205695 A1 Aug. 25, 2011

(51) Int. Cl.
*H05K 5/00* (2006.01)
*H05K 7/00* (2006.01)

(52) U.S. Cl. ......... 361/679.01; 361/679.09; 361/679.15; 361/679.16; 361/679.26; 361/679.27; 361/679.3; 455/575.3

(58) Field of Classification Search ............. 361/679.01, 361/679.02, 679.08, 679.09, 679.3, 679.55–679.59; 455/325, 556.1, 550.1, 90.1, 575.1; 16/367, 16/337, 319, 344, 336, 302, 342, 282, 283, 16/308, 368, 379, 343, 330
See application file for complete search history.

(56) References Cited

U.S. PATENT DOCUMENTS

| | | | |
|---|---|---|---|
| 5,325,984 A | 7/1994 | Ady et al. | |
| 5,987,704 A * | 11/1999 | Tang | 16/354 |
| 6,434,371 B1 | 8/2002 | Claxton | |
| 7,155,266 B2 | 12/2006 | Stefansen | |
| 7,345,872 B2 | 3/2008 | Wang | |
| 2006/0018102 A1 | 1/2006 | Soderlund | |
| 2008/0232043 A1 | 9/2008 | Wang | |
| 2009/0231786 A1 * | 9/2009 | Takamori et al. | 361/679.01 |
| 2011/0157799 A1 * | 6/2011 | Harmon et al. | 361/679.01 |

FOREIGN PATENT DOCUMENTS

| | | |
|---|---|---|
| EP | 1335567 A1 | 8/2003 |
| EP | 1601165 A1 | 11/2005 |

OTHER PUBLICATIONS

Microsoft Courier; http://gizmodo.com/5365299/courier-first-details-of-microsoft-secret-tablet; Sep. 28, 2009; 2 pages.
Asus Eeee Reader ebook; http://www.slashgear.com/asus-eee-reader-ebook-device-in-final-development-two- screen-sizes-1556726/; Sep. 15, 2009; 1 page.
International Telecomunication Union; COM 16-C 440-E; Draft ToRs, time schedule and qualification test conditions to develop EVRC-WB interworking annex to G.EV-VBR; Apr. 2008; 11 pages.
Amphenol-Phoenix; Parallel 2 Axes Hinge Device for Mobile Phone; 2004; 4 pages.

* cited by examiner

*Primary Examiner* — Jayprakash N Gandhi
*Assistant Examiner* — Jerry Wu
(74) *Attorney, Agent, or Firm* — Roland K. Bowler, II; Stephen H. Shaw

(57) ABSTRACT

A portable electronic device includes first and second housing portions pivotal about corresponding pivot axes. A biasing member urges a first cam surface of the first housing portion into engagement with a second cam surface of the second housing portion. The biasing member also urges indexing members of the first and second housing portions into engagement to maintain synchronization of the housing portions during rotation, wherein the first and second housing portions are configured in a fixed angular orientation when the first cam surface is engaged with the second cam surface.

12 Claims, 8 Drawing Sheets

HINGE MECHANISM IN ELECTRONIC HANDSET

FIELD OF THE DISCLOSURE

The present disclosure relates generally to portable hinged devices and, more particularly, to hinge mechanisms for and in portable devices, for example, in a clam-shell style wireless communication handset, and combinations thereof.

BACKGROUND

Clam-shell wireless communication handsets having hinged housing portions are known generally. U.S. Publication No. 2008/0232043 to Wang entitled "Handheld Electronic Device Having A Cover Turnable 360 Degrees Relative to Body Thereof", for example, discloses a cover, a main body and an interconnecting hinge structure with first and second pivot axes. In Wang, the cover and main body each include curved surfaces with protruding teeth that mesh when the cover and the main body are pivoted about the corresponding pivot axes.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
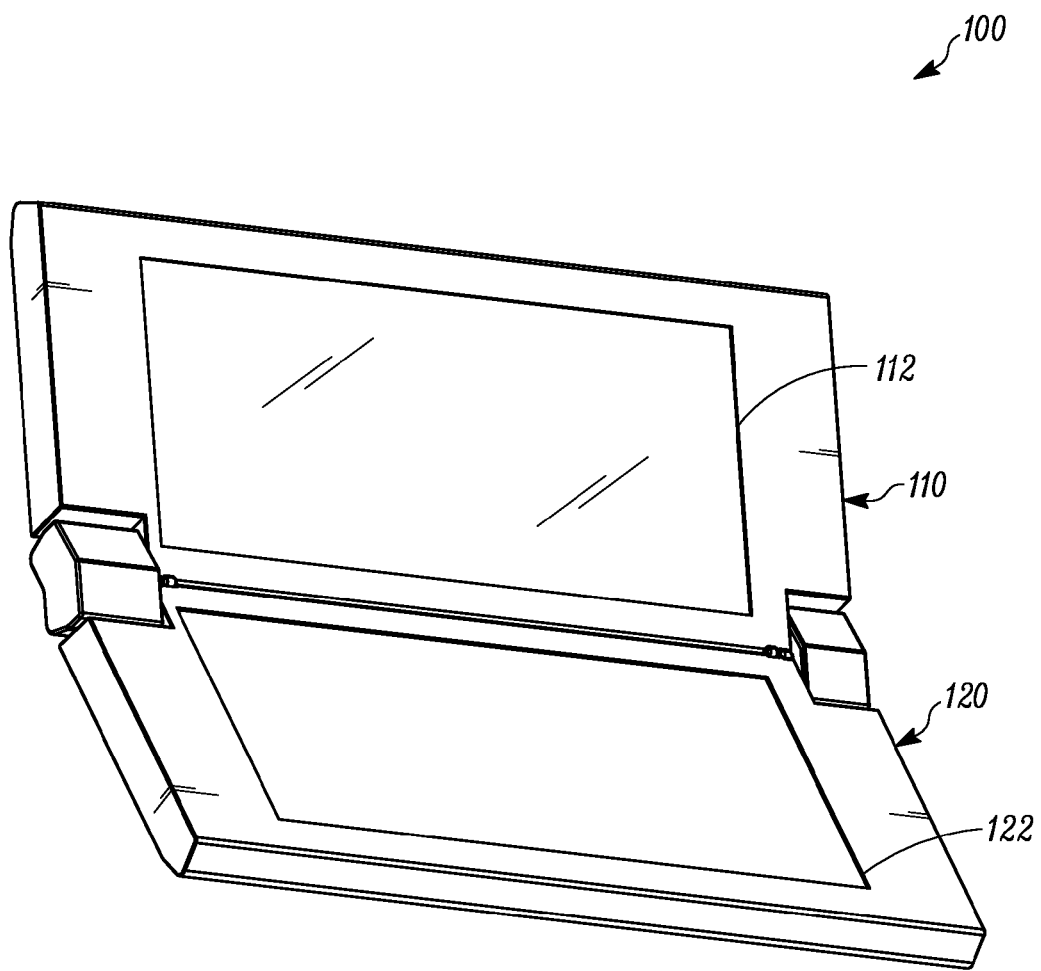
FIG. 1 is a schematic diagram of a portable electronic device.

In FIG. 1, a portable hinged device 100 having a first housing portion 110 and a second housing portion 120 pivotal about corresponding pivot axes as described more fully below. In one implementation, the hinged device is embodied as a handheld electronic device 100 comprising a display component 112 coupled to or integrated with the first housing portion 110 and user input elements 122 coupled to or integrated with the second housing portion 120. In FIG. 1, the display and input elements are disposed on facing sides of the housing portions, but in other embodiments these or other user interface elements may be disposed on inner and/or outer sides of either or both of the first and second housing portions. The user interface elements may include, but are not limited to, one or more of the following components: visual display; a keypad and/or touch screen suitable for inputting alphanumeric and other symbolic characters or information; audio inputs and outputs; and gesture sensors, among other user interface elements now know or later developed. More generally however the device may not be electronic. The type, location and configuration of the user interface elements, if any, are not particularly relevant to the subject of the disclosure and thus the particular implementation of the user interface is not intended to limit the disclosure.

Some electronic devices include a controller that controls functionality of the device. In these embodiments, the controller controls the functionality of the user interface elements. The figures do not illustrate a controller but controllers and associated elements like memory are well known generally to those of ordinary skill in the art. In a more particular implementation, the portable electronic device is embodied as a wireless communication device comprising one or more wireless transceivers. For example, the transceiver may be a cellular transceiver, a WAN or LAN transceiver, a personal space transceiver like a Bluetooth transceiver, a satellite signal transceiver, or some other wireless transceiver, or a combination of two or more of such transceivers. In another implementation, the portable electronic device is embodied as a personal electronic organizer with or without wireless communication capability. In other implementations, the wireless communication device includes a receiver or a transmitter, either alone or in combination with a wireless transceiver. For example, the device may include a satellite positioning system (SPS) receiver, a television or radio signal receiver, or some other receiver. The device may thus be embodied as a satellite navigation device, or a handheld scanning device, or a portable multimedia recording and/or playback device, with or without wireless communications capabilities. The particular implementation of the hinged device is not intended to limit the disclosure.

In one embodiment, the controller is embodied as a programmable processor that executes firmware or software stored in one or more memory devices wherein the firmware or software enables some functionality of the portable electronic device. Such a controller is typically coupled to a memory device, which may be embodied as one or more discrete devices including, but not limited to, volatile or non-volatile memory such as a random access memory (RAM) and read-only memory (ROM) among other memory devices. Alternatively, the functionality of the portable electronic device may be implemented by equivalent hardware circuits or by a combination of software and hardware. The enablement of the basic functionality of portable electronic devices including wireless communication devices, personal electronic organizers and other portable electronic devices is known generally by those having ordinary skill in the art and is not discussed further herein.

In some portable electronic devices including a programmable processor, the device includes an operating system that accommodates one or more software-based applications. In wireless communication device applications, the operating system could be embodied as ANDROID, WINDOWS MOBILE, SYMBIAN or some other proprietary or non-proprietary operating system. More generally, however, the portable electronic device does not include any operating system. In some embodiments, the functionality is controlled by embedded software or firmware and in other embodiments the functionality is implemented by hardware equivalent circuits or a combination thereof. The particular architecture of the operating system and/or processor executable programs that control the functionality of the device, if any, is not intended to limit the disclosure.

According to one aspect of the disclosure, the first housing portion of the portable hinged device includes an outer side edge defining a first cam surface, and the second housing portion includes an outer side edge defining a second cam surface. In one implementation, each of the first and second cam surfaces include complementary portions that mate or engage one another under a bias to configure at least one fixed angular orientation of the first and second housing portions when the first and second housing portions are pivoted about corresponding pivot axes.

Figure 2:
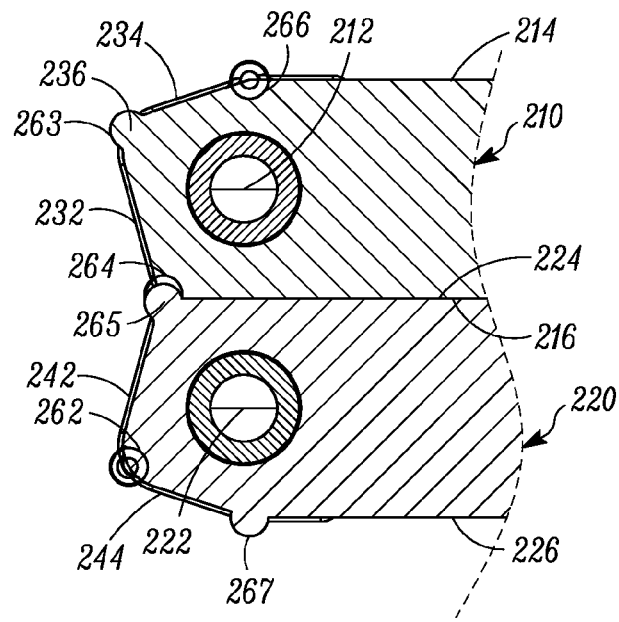
FIG. 2 is a hinged portable device in a first configuration.

FIG. 2 illustrates first and second housing portions 210 and 220 each of which is pivotally disposed about corresponding pivot axes 212 and 222, respectively, as described further below. The first housing portion 210 includes a first cam surface having two separate cam surface portions 232 and 234. In FIG. 2, the separate cam surface portions are relatively flat or planar and are orientated at an angle relative to each other and at corresponding angles relative to opposite inner and outer sides 214 and 216 of the housing portion 210. The two separate cam surface portions are separated by a protruding portion 236 formed by an apex of the intersecting cam surface portions. Similarly, the second housing portion 220 includes a first cam surface having two separate cam surface portions 242 and 244 oriented at an angle relative to each other and at corresponding angles relative to opposite inner and outer sides 224 and 226 of the housing portion 220. The two separate cam surface portions are separated by a cavity portion 262 formed by an apex between the cam surface portions. The separate cam surfaces 242 and 244 are also relatively flat or planar and are orientated at an angle relative to each other and at corresponding angles relative to opposite inner and outer sides 224 and 226 of the housing portion 220.

More generally, each cam surface of the first and second housing portions has at least one cam surface portion wherein the cam surface portion of the first housing portion mates with the cam surface portion of the second housing portion to configure at least a fixed angular orientation of the first and second housing portions, wherein the first and second housing portions are at least partially opened. A biasing member maintains the housing portions in an angular orientation unless and until the housing portions are pivoted one way or the other against the bias. In other embodiments, each cam surface includes multiple surface portions wherein the multiple cam surface portions of the first and second housing portions mate under bias to configure a corresponding number of fixed angular configurations. The cam surface portions may include any surface shape, other than a flat or planar shape, so long as the cam surface portions may be stably engaged under the bias to fix an angular configuration of the first and second housing portions.

Figure 3:
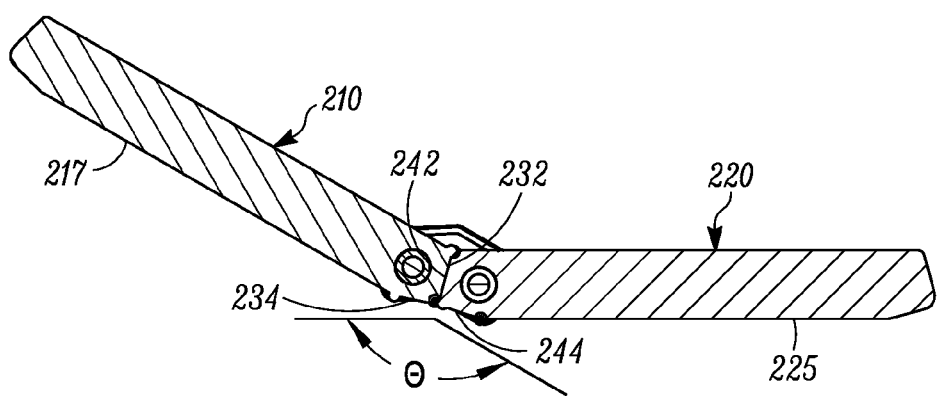
FIG. 3 is a hinged portable device in a second configuration.
Figure 4:
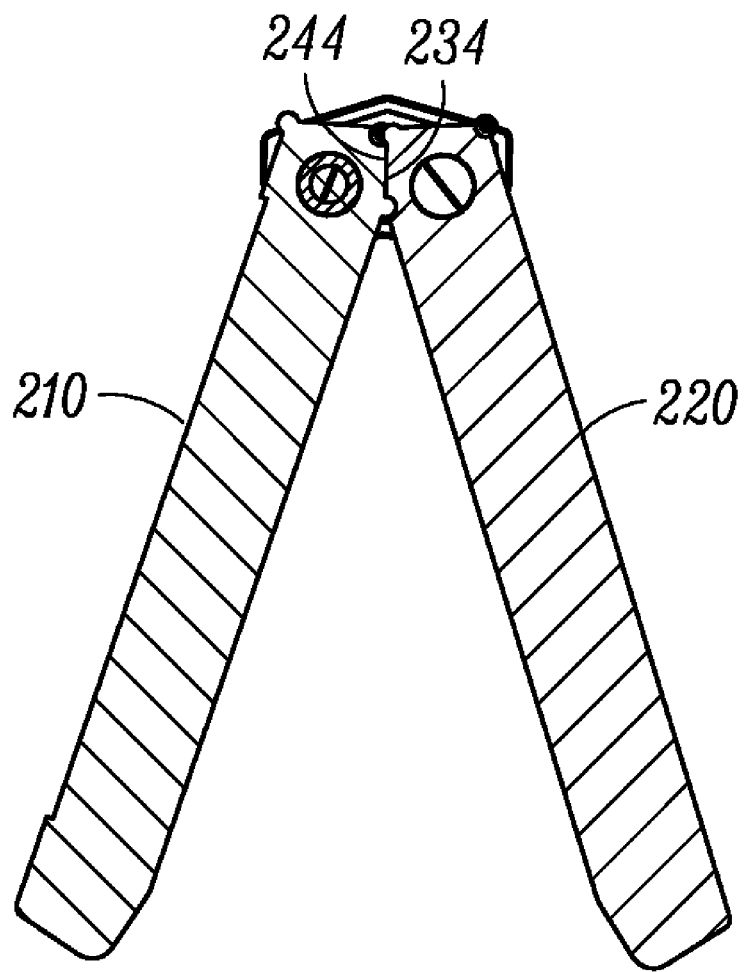
FIG. 4 is a hinged portable device in a third configuration.

Generally, the first and second housing portions are configured in a particular angular orientation when a cam surface portion of the first housing portion is engaged under bias with a complementary cam surface portion of the second housing portion. For example, FIG. 3 illustrates a cam surface portion 232 of the first housing portion engaged with a cam surface portion 242 of the second housing portion when the first and second housing portions are pivoted or positioned until the cam surface portions are adjacent to each other. FIG. 4 illustrates a cam surface portion 234 of the first housing portion 210 engaged with a cam surface portion 244 of the second housing portion 220 when the first and second housing portions are pivoted or positioned until the cam surface portions are adjacent to each other. A biasing member described more fully below maintains the cam surface portions in mating engagement to fix the angular configuration or orientation of the first and second housing portions until the bias is overcome by further pivoting of the housing portions.

Figure 5:
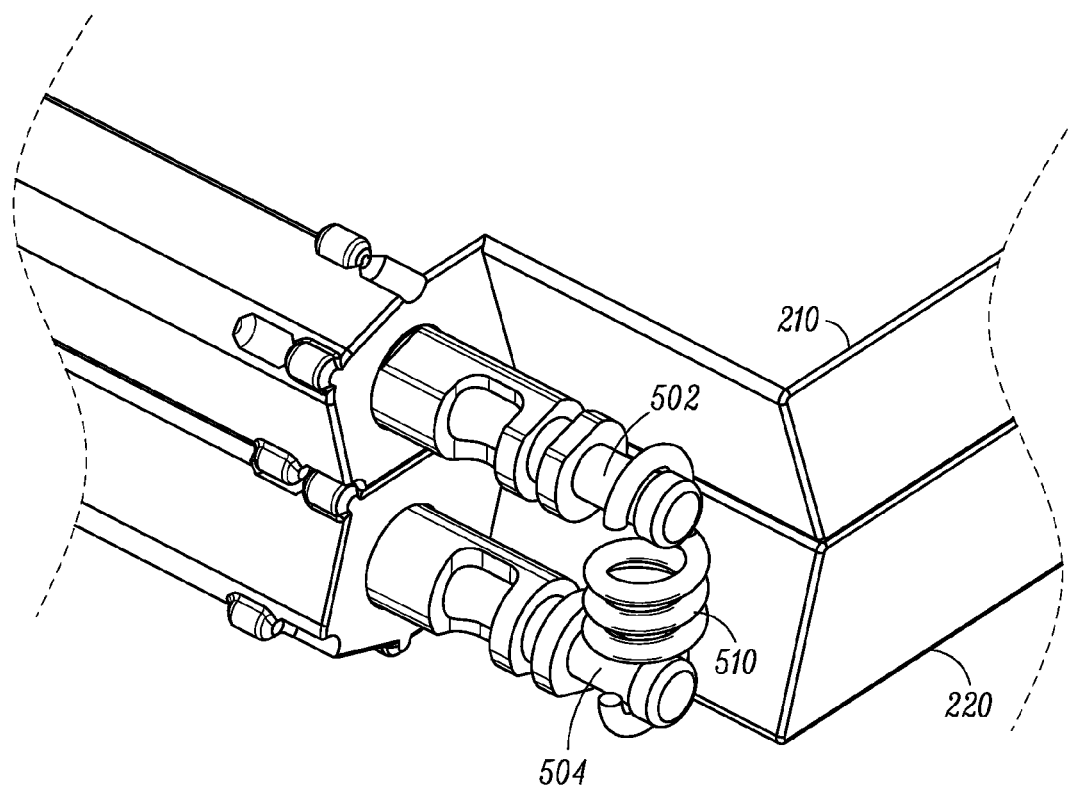
FIG. 5 illustrates a portion of a hinged device including a coil spring biasing member.
Figure 6:
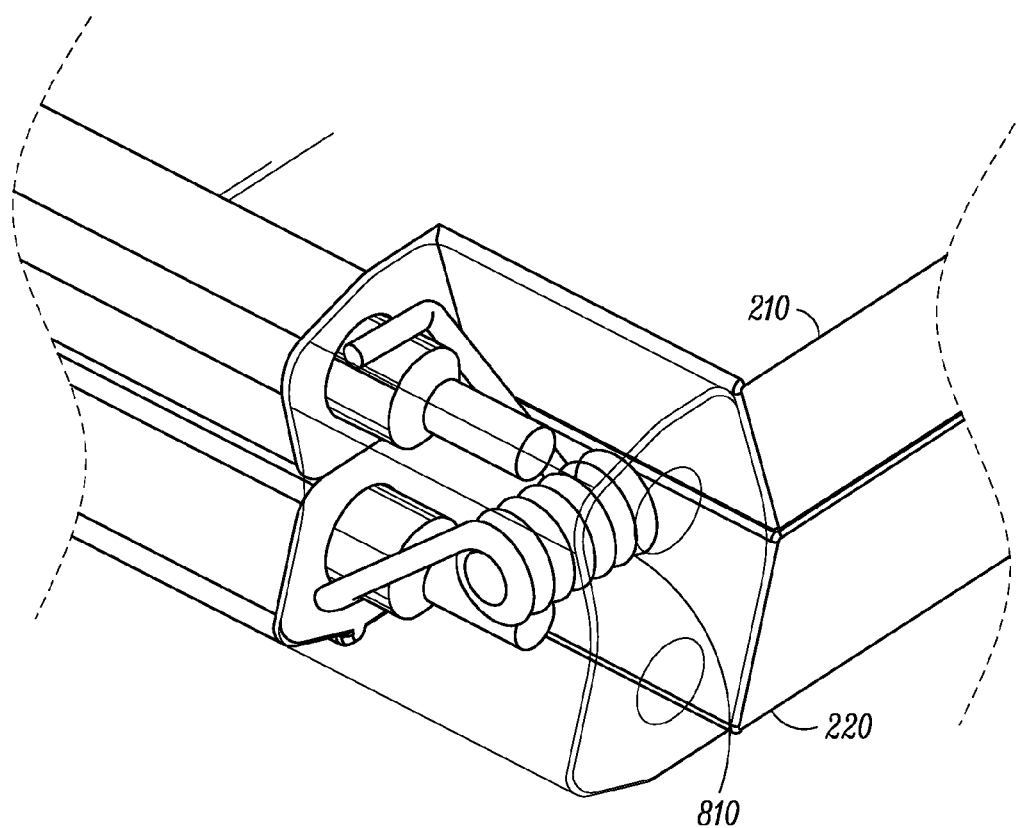
FIG. 6 illustrates a portion of a hinged device including a torsion spring biasing member.

In one embodiment, first shaft portions protrude from opposite ends of the first housing portion, wherein the first shaft portions are disposed along a first pivot axis of the first housing portion. The first pivot axis is disposed along the side edge of the first housing portion. In FIG. 5, a first shaft portion 502 protrudes from one end of the first housing portion 210 and a second shaft portion 504 protrudes from an end of the second housing portion 220. A coil spring 510 interconnects the first and second shaft portions and biases the first and second housing portions together as described further below. In this embodiment, the opposite ends of the first and second housing portions also include corresponding first and second shaft portions that are substantially collinear with the shaft portions illustrated such that the first and second housing portions are pivotable about their respective axes. Alternatively, a band spring could provide the bias on the housing portions. FIG. 6 illustrates an alternative embodiment where the first and second housing portions are interconnected by a torsion spring 610 that biases the first and second housing portions together. The springs tend to bias the first and second housing portions together as the first and second cam portions interact during pivoting of the first and second housing portions about the respective pivot axes as described further below. The shaft portions interconnected by these and other springs may flex somewhat under the bias of the spring, rendering the shaft portions not precisely parallel.

Figure 7:
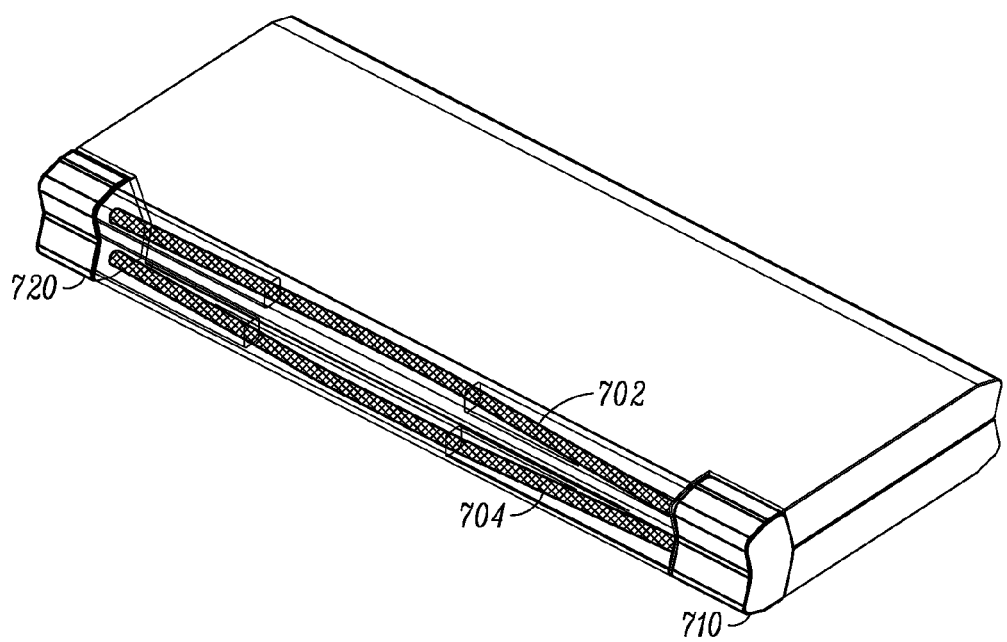
FIG. 7 illustrates a hinged device including a flexed linear spring biasing members.

FIG. 7 illustrates another alternative embodiment where the first and second housing portions are biased together by spring elements or flexible rods 702 and 704. In this embodiment, the first shaft portions protruding from opposite ends of the first housing portion are coupled to a first flexible rod disposed through the first housing portion, and the second shaft portions protruding from opposite ends of the second housing portion are coupled to a second flexible rod disposed through the second housing portion. In one implementation, the first shaft portions constitute a first unitary flexible rod and the second shaft portions constitute a second unitary rod. The flexible rods are disposed through openings within the corresponding housing portions, wherein the openings are sufficiently spacious to permit the flexible rods to bend or bow within the housing portions as discussed below. A first end cap 710 is fastened to the first shaft portion and the second shaft portion extending from one end of the first and second housing portions. A second end cap 720 is fastened to the other first shaft portion and the other second shaft portion extending from the opposite end of the first and second housing portions. In one embodiment, each end cap includes openings that accept and retain the end portions of the flexible rods 702 and 704. The openings in each end cap are spaced apart such that the flexible rods flex, bend or bow when the end portions of the flexible rods are inserted into the end cap openings. Apertures in the opposite ends of the housing portions act as fulcrums over which the end portions of the flexible rods are flexed to facilitate insertion into the end caps. The flexing of the flexible rods causes mid-portions of the flexible rods to move or bow apart as illustrated in FIG. 7. The flexible rods tend to bias the first and second housing portions together as the first and second cam portions interact during pivoting of the first and second housing portions about the respective pivot axes as described further below.

In FIG. 2, as the first and second housing portions 210 and 220 pivot in unison about the pivot axes 212 and 222, the cam surface portions engage. According to this aspect of the disclosure, a dimension between the pivot axes of the first and second housing portions varies depending on the points of contact between the mating cam surface portions. Generally, protruding portions between the first and second housing portions causes the dimension between the pivot axes 212 and 222 to increase against the bias of the biasing member during pivoting. On the first housing portion, a first protruding portion is an apex formed between the side 216 of the first housing portion and the cam surface portion 232. Another protruding portion of the first housing portion 210 is the apex 236 of the cam portion. An apex between the cam surface portion 234 and the side portion 214 forms another apex. Similar protruding portions exist on the second housing portion.

In FIG. 2, the first and second housing portions are configured such that the sides 216 and 224 are adjacent to each other. The biasing member, not show in FIG. 2, tends to maintain the housing portions in this configuration, which is relatively stable. Here, the angle between the first and second housing portions is 0 degrees. Pivotal movement of the first and second housing portions in a manner that increases the angle between the housing portions requires the input of energy to overcome the bias of the biasing member. The first and second housing portions are pivotally unstable when the protruding portions are engaged since the contours of the protruding portions permit pivoting of the first and second housing portions in either direction under the bias of the biasing member. Upon further pivoting of the first and second housing portions 210 and 220, the cam surface portions 232 and 242 eventually engage and arrest further pivoting under the bias of the biasing member. In this angular orientation, the biasing member maintains the angle φ between the first and second housing portions 210 and 220 unless and until the housing portions are further pivoted in one direction or the other. Further pivoting of the first and second housing portions will eventually be arrested by the engagement of the cam surface portions 234 and 244, assuming that the housing portions are not further pivoted against the bias of the biasing member. Further pivoting of the first and second housing portions will be arrested by the sides 217 and 225 provided that the first and second housing portions are not prevented from pivoting to such an extent. Thus generally the housing portions are configured in a stable angular orientation when complementary cam surface portions are engaged under the bias of the biasing member, and the housing portions are in an unstable configuration when the protruding portions of the cam surfaces are engaged under the bias of the biasing member.

Figure 8:
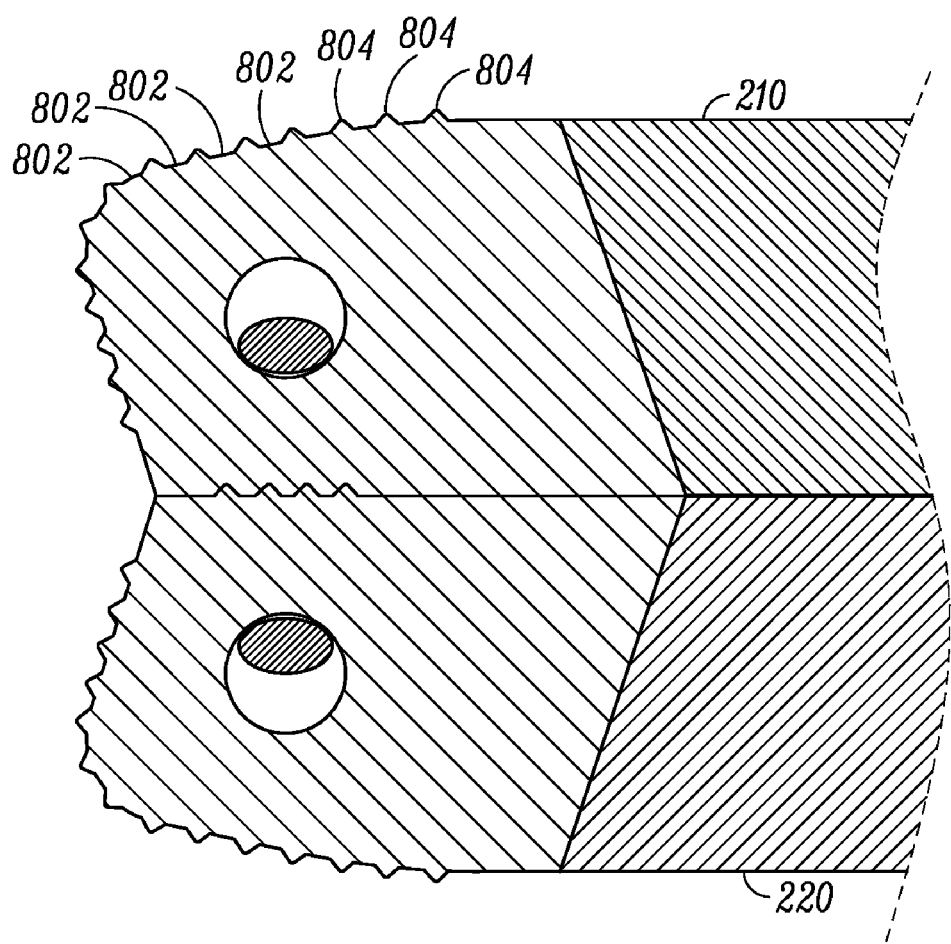
FIG. 8 illustrates a hinged device including external indexing members.

Generally, the first and second housing portions each include indexing members that interact with each other to synchronize pivoting or rotation of the first and second housing portions about the respective first and second pivot axes. The biasing member tends to urge the first and second indexing members into cooperative engagement. The synchronization of the pivotal action of the first and second housing portions maintains the alignment of the corresponding cam surface portions during pivoting. In FIG. 8, each of the first and second housing portions include a series of complementary depressions and protrusions, or ridges and grooves, 802 and 804 disposed on the corresponding cam portions. These indexing members need not extend fully across the housing portion, but they may. In one embodiment the indexing members are disposed only on a central portion of the housing portions. In another embodiment, the indexing members are disposed laterally on the housing portions. In operation, as the first and second housing portions are pivoted, the indexing members interact to prevent relative slippage of the housing portions thereby maintaining synchronization of, or alignment between, the cam surface portions thereof. The indexing members should be dimensioned to ensure engagement or interaction of the complementary elements through the full range of variation in the separation of the pivot axes 212, 222 as the first and second housing portions are pivoted.

FIGS. 2 and 3 illustrate another alternative embodiment where the indexing members are located on an outer portion of the first and second housing portions. In this embodiment, the number of indexing members is reduced by strategically locating the indexing members about the cam surfaces. The indexing members are located at the protruding portions defined by the apexes between cam surface portions and the sides of the housing portions. In FIG. 2, for example, cavities or recesses 262, 264 and 266 interact with corresponding complementary shaped bulbous portions 263, 265 and 267, respectively, during pivoting of the first and second housing portions. In other embodiments, the indexing members may have complementary shapes other than those illustrated in FIGS. 2 and 3. In this embodiment, where the indexing members are located where pivotal instability is desired, the indexing members should be configured so that the first and second housing portions are not pivotally fixed when the indexing members are engaged. The indexing members should also be dimensioned to ensure engagement or interaction of the complementary elements through the full range of variation in the separation of the first and second pivot axes during pivoting.

Figure 9:
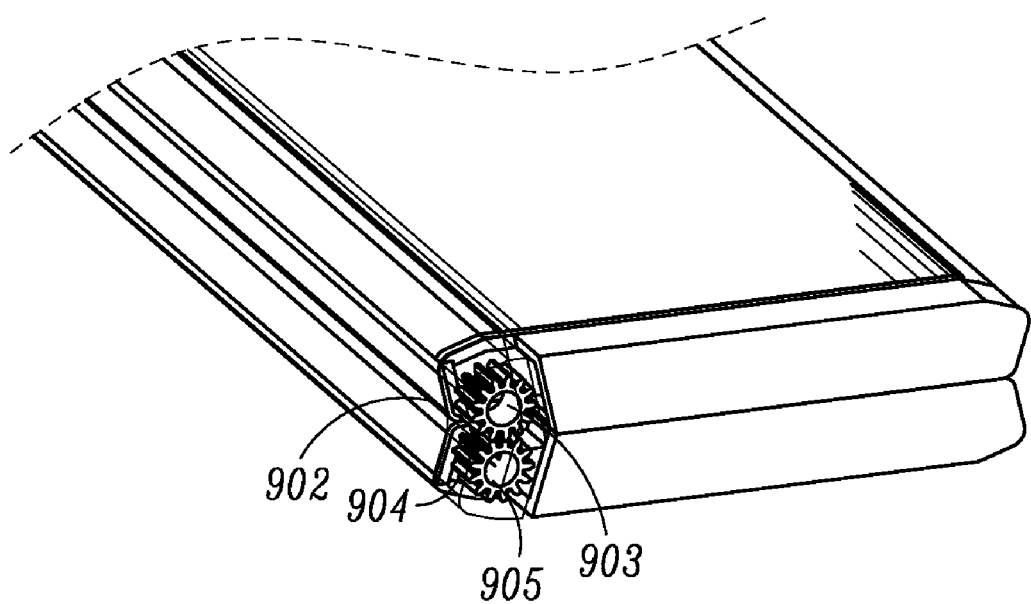
FIG. 9 illustrates a hinged device including internal indexing members.

FIG. 9 illustrates an alternative embodiment where the indexing members are embodied as complementary toothed cogs 902 and 904 each of which is pivotally disposed about a corresponding one of the first and second pivot axis 903 and 905, respectively. In this embodiment, the toothed cogs are engaged during the pivoting action of the first and second housing portions, thereby synchronizing the rotation of the housing portions. In other embodiments, the distinction between the cam surface portions and the indexing member is less distinct. More particularly, in some embodiments, the shape of the cam surface portions is such that it functions to both index rotation of the housing portions and also to provide complementary engagement surfaces that, when in contact, arrest the rotation of the first and second housing portions. For example, cam surfaces with appropriately shaped cam surface portions may provide adequate synchronization.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A portable electronic device comprising: a first housing portion pivotal about a first pivot axis, the first housing portion including an outer side edge formed partially about the pivot axis, a first cam surface disposed on the outer side edge of the first housing portion; a first indexing member disposed on the first housing portion; a second housing portion pivotal about a second pivot axis, the second housing portion including an outer side edge formed partially about the pivot axis, a second cam surface disposed on the outer side edge of the second housing portion;

wherein a spacing between the first and second pivot axes changes resulting from engagement between the first and second cam surfaces as the first and second housing portions are pivoted about the corresponding first and second pivot axes;

a second indexing member disposed on the second housing portion;

a biasing member biasing the first and second cam surfaces into engagement during pivoting of the first and second housing portions, the biasing member biasing the first and second indexing members into engagement during pivoting of the first and second housing portions; and a first spring interconnecting one of a first shaft portions and one of a second shaft portions, and a second spring interconnecting the other of the first shaft portions and the other of the second shaft portions; wherein the first and second housing portions are configured in a fixed angular orientation when complementary portions of the first and second cam surfaces are engaged.

2. The device of claim 1, wherein the first and second indexing members synchronizing rotation of the first and second housing portions about the respective first and second pivot axes.

3. The device of claim 1,
the first cam surface having first and second surface portions separated by a first protruding portion, the second cam surface having first and second surface portions separated by a second protruding portion,
the portable electronic device in a first spatial configuration when the first surface portion of the first cam surface is engaged with the first surface portion of the second cam surface,
the portable electronic device in a second spatial configuration when the second surface portion of the first cam surface is engaged with the second surface portion of the second cam surface.

4. The device of claim 1, the first indexing member including a plurality of protrusions on the outer side edge of the first housing portion defining the first cam surface, the second indexing member including a plurality of recesses on the outer side edge of the second housing portion defining the second cam surface, wherein the protrusions engage the recesses as first and second housing portions pivot about the respective first and second pivot axes.

5. The device of claim 1, the first indexing member including a first gear disposed about the first pivot axis, the second indexing member including a second gear disposed about the second pivot axis, wherein the first gear is engaged with the second gear when the first and second housing portions pivot about the respective first and second pivot axes.

6. The device of claim 1,
the first cam surface having two separate cam surface portions, the second cam surface having two separate cam surface portions,
the first and second housing portions configured in a first angular orientation when one of the two separate cam surface portions of the first housing portion is engaged with a corresponding one of the two separate cam surface portions of the second housing portion,
the first and second housing portions configured in a second angular orientation when the other of the two separate cam surface portions of the first housing portion is engaged with a corresponding other one of the two separate cam surface portions of the second housing portion,
the first and second housing portions at least partially opened between the first and second angular orientations.

7. The device of claim 1,
the first cam surface having a cam surface portion, the second cam surface having a cam surface portion,
the first and second housing portions configured in an angular orientation when the cam surface portion of the first housing portion is engaged with the cam surface portion of the second housing portion,
wherein the first and second housing portions are at least partially opened in the angular orientation.

8. The device of claim 7,
the first shaft portions protruding from opposite ends of the first housing portion are coupled to a first flexible rod disposed through the first housing portion, the second shaft portions protruding from opposite ends of the second housing portion are coupled to a second flexible rod disposed through the second housing portion,
a first end cap fastened to the first shaft portion and the second shaft portion extending from one end of the first and second housing portions, and a second end cap fastened to the first shaft portion and the second shaft portion extending from another end of the first and second housing portions,
the first and second end caps biasing the first and second shaft portions together in a manner that flexes the first and second flexible rods disposed through the first and second housing portions,
wherein the first and second flexible rods bias the first and second housing portions together.

9. The device of claim 1, wherein the first indexing member is disposed on the outer side edge of the first housing portion and the second indexing member is disposed on the outer side edge of the second housing portion.

10. The device of claim 1, wherein the first indexing member is a first gear disposed about the first pivot axis and the second indexing member is a second gear disposed about the second pivot axis.

11. A portable electronic device comprising: a first housing portion having an outer side edge defining a first cam surface, the first housing portion having a first indexing member; a first shaft portions protruding from opposite ends of the first housing portion, the first shaft portions disposed along a first pivot axis of the first housing portion wherein the first pivot axis is disposed along the outer side edge of the first housing portion; a second housing portion having an outer side edge defining a second cam surface, the second housing portion having a second indexing member; a second shaft portions protruding from opposite ends of the second housing portion, the second shaft portions disposed along a second pivot axis of the second housing portion wherein the second pivot axis is disposed along the outer side edge of the second housing portion;
wherein a spacing between the first and second pivot axes changes resulting from engagement between the first and second cam surfaces as the first and second housing portions are pivoted about the corresponding first and second pivot axes;
a biasing member engaged with the first shaft portions and the second shaft portions, the biasing member urging the first cam surface into engagement with the second cam surface, the biasing member urging the first indexing member into engagement with the second indexing member; and a first spring interconnecting one of the first shaft portions and one of the second shaft portions, and a second spring interconnecting the other of the first shaft portions and the other of the second shaft portions; wherein the first and second housing portions are configured in a fixed angular orientation when complementary portions of the first cam surface and the second cam surface are engaged.

12. The device of claim 11, wherein the first and second indexing members synchronize rotation of the first and second housing portions about the respective first and second pivot axes.

* * * * *